(12) United States Patent
Tabet et al.

(10) Patent No.: US 9,820,239 B2
(45) Date of Patent: Nov. 14, 2017

(54) POWER ALLOCATION FOR ENCODED BITS IN OFDM SYSTEMS

(71) Applicant: Apple Inc., Cupertino, CA (US)

(72) Inventors: Tarik Tabet, Los Gatos, CA (US); Konstantinos Sarrigeorgidis, Sunnyvale, CA (US); S. Aon Mujtaba, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 524 days.

(21) Appl. No.: 14/445,963

(22) Filed: Jul. 29, 2014

(65) Prior Publication Data

US 2015/0373649 A1     Dec. 24, 2015

Related U.S. Application Data

(60) Provisional application No. 62/015,159, filed on Jun. 20, 2014.

(51) Int. Cl.
| | | |
|---|---|---|
| *H04W 52/34* | (2009.01) | |
| *H04W 52/24* | (2009.01) | |
| *H04L 1/00* | (2006.01) | |
| *H04L 27/26* | (2006.01) | |
| *H04L 27/34* | (2006.01) | |
| *H04L 5/00* | (2006.01) | |

(52) U.S. Cl.
CPC .......... *H04W 52/24* (2013.01); *H04L 1/0041* (2013.01); *H04L 1/0042* (2013.01); *H04L 5/006* (2013.01); *H04L 5/0046* (2013.01); *H04L 5/0048* (2013.01); *H04L 5/0092* (2013.01); *H04L 27/2626* (2013.01); *H04L 27/3405* (2013.01); *H04W 52/346* (2013.01); *H04L 5/0023* (2013.01)

(58) Field of Classification Search
None
See application file for complete search history.

(56) References Cited

U.S. PATENT DOCUMENTS

| | | | |
|---|---|---|---|
| 7,599,443 B2 | 10/2009 | Ionescu et al. | |
| 7,746,762 B2 * | 6/2010 | Sudo | H04L 1/0006 370/208 |

(Continued)

OTHER PUBLICATIONS

T. M. Duma and M. Salehi. "On optimal power allacation for turbo codes," in Proc. IEEE ISIT. Ulm, Germany, Jun. 1997, p. 104.*

(Continued)

*Primary Examiner* — Gregory Sefcheck
*Assistant Examiner* — Jenkey Van
(74) *Attorney, Agent, or Firm* — Meyertons Hood Kivlin Kowert & Goetzel, P.C.; Jeffrey C. Hood (57) ABSTRACT

Power allocation for encoded bits in OFDM systems. OFDM symbol subcarriers may be allocated to a wireless user equipment (UE) device by a base station. A first portion of the allocated subcarriers may include systematic bits and a second portion of the allocated subcarriers may include parity bits according to a coding scheme. Transmit power may be unevenly allocated to the subcarriers allocated to the UE, such that subcarriers including systematic bits are allocated different power than the subcarriers including parity bits. The OFDM symbols including the subcarriers allocated to the UE may be transmitted to the UE by the base station according to the allocated power distribution.

14 Claims, 9 Drawing Sheets

(56) References Cited

U.S. PATENT DOCUMENTS

| | | | |
|---|---|---|---|
| 2002/0186784 A1* | 12/2002 | Kim | H04L 1/0041 375/298 |
| 2004/0184553 A1* | 9/2004 | Hottinen | H03M 13/258 375/264 |
| 2005/0169392 A1* | 8/2005 | Redfern | H04L 27/2602 375/260 |
| 2006/0160498 A1* | 7/2006 | Sudo | H03M 13/37 455/103 |
| 2007/0248176 A1* | 10/2007 | Miyoshi | H04L 1/0056 375/260 |
| 2008/0032731 A1* | 2/2008 | Shen | H04W 52/346 455/522 |
| 2008/0240273 A1* | 10/2008 | Akita | H03M 13/09 375/260 |
| 2008/0267122 A1* | 10/2008 | Han | H04L 25/0226 370/329 |
| 2009/0067543 A1* | 3/2009 | Hsiao | H04B 7/0617 375/298 |
| 2009/0104908 A1* | 4/2009 | Matsumoto | H04L 5/0046 455/436 |
| 2009/0128410 A1 | 5/2009 | Li | |
| 2010/0081467 A1* | 4/2010 | Alex | H04L 5/0023 455/509 |
| 2010/0104044 A1* | 4/2010 | Kishigami | H04L 27/2628 375/299 |
| 2010/0232542 A1* | 9/2010 | Miyoshi | H04L 1/0041 375/295 |
| 2011/0103296 A1* | 5/2011 | Ji | H04B 7/15528 370/315 |
| 2011/0249569 A1* | 10/2011 | Mashino | H04J 11/0023 370/242 |
| 2012/0224555 A1 | 9/2012 | Lleee | |
| 2013/0107984 A1* | 5/2013 | Chugg | H04L 1/0042 375/295 |
| 2013/0135988 A1* | 5/2013 | Kim | H04L 1/1819 370/216 |
| 2013/0343433 A1* | 12/2013 | Yang | H04B 1/707 375/146 |

OTHER PUBLICATIONS

A. H. S. Mohmadi and A. K. Khandani. "Unequal power allocation to the turbo-encoder output bits with application CDMA systems:" IEEE Trans. Commun., vol. 47. pp. 1609-1610, Nov. 1999.*

S.-J Park and S. W, Kim, "Transmission power allocation in turbo codes:" in Proc. IEEE VTC. Tokyo. Japan. May 2000, pp. 2073-2075.*

* cited by examiner

POWER ALLOCATION FOR ENCODED BITS IN OFDM SYSTEMS

PRIORITY CLAIM

The present application claims benefit of priority to U.S. Provisional Application No. 62/015,159 titled "Power Allocation for Encoded Bits in OFDM Systems" and filed on Jun. 20, 2014, whose inventors are Tarik Tabet, Konstantinos Sarrigeorgidis, and S. Aon Mujtaba, which is hereby incorporated by reference in its entirety as though fully and completely set forth herein.

FIELD

The present application relates to wireless devices, and more particularly to a system and method for allocating power to encoded bits in orthogonal frequency division multiplexing (OFDM) wireless communication systems.

DESCRIPTION OF THE RELATED ART

Wireless communication systems are rapidly growing in usage. Additionally, there exist numerous different wireless communication technologies and standards. Some examples of wireless communication standards include GSM, UMTS (WCDMA), LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Many such wireless communication standards utilize multiple access schemes, such as time division multiple access (TDMA), code division multiple access (CDMA), frequency division multiple access (FDMA) and various other multiple access schemes. In some instances, orthogonal frequency division multiplexing (OFDM) may be used as a multiple access scheme, for example if different OFDM subcarriers may be assigned to different users.

Channel coding may also be used in conjunction with wireless communication systems in many cases, for example to improve the robustness of the wireless communication system in case of adverse channel conditions. Examples of channel coding techniques may include convolutional coding and turbo coding, among various possibilities.

SUMMARY

Embodiments are presented herein of, inter alia, methods for allocating power to encoded bits in OFDM systems (such as used for downlink communications in LTE), and of devices configured to implement the methods.

After channel coding (for example using turbo coding), a bit stream may include systematic and parity bits. The systematic bits may be related to channel value, whereas the parity bits may be used to calculate extrinsic information and a-priori information. While channel value may not change with iterations, extrinsic and a-priori information may become more reliable as the number of iterations increases. Parity bits may thus be more important to successful decoding relative to systematic bits as the number of iterations increases. Use of a dynamic power allocation strategy which increases emphasis on parity bits as the number of iterations increases may accordingly improve performance.

It may also be desirable for such a dynamic power allocation strategy to depend on noise considerations (e.g., $E_b/N_0$, SNR). For example, when the quality of systematic bits is not sufficient (e.g., due to noise), even with good quality parity bits, the coding gain of interest may not be obtained. This may suggest a power transfer to the systematic bits at low SNR values.

Thus, according to the techniques described herein, transmit power allocation to subcarriers containing systematic bits may differ from power allocation to subcarriers containing parity bits. The resulting (uneven) power allocation may favor either the systematic bits or the parity bits, depending on the various factors which are considered in determining how to allocate transmit power between the systematic and parity bits. If desired, other factors (in addition to or instead of those previously described) may be considered in determining the power allocation distribution, such as code block size and/or code distance.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.
3GPP: Third Generation Partnership Project
3GPP2: Third Generation Partnership Project 2
GSM: Global System for Mobile Communications
UMTS: Universal Mobile Telecommunications System
LTE: Long Term Evolution
OFDM: Orthogonal Frequency Division Multiplexing
QAM: Quadrature Amplitude Modulation
QPSK: Quadrature Phase Shift Keying
TTI: Transmission Time Interval
RB: Resource Block
RE: Resource Element
RS: Reference Symbol

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
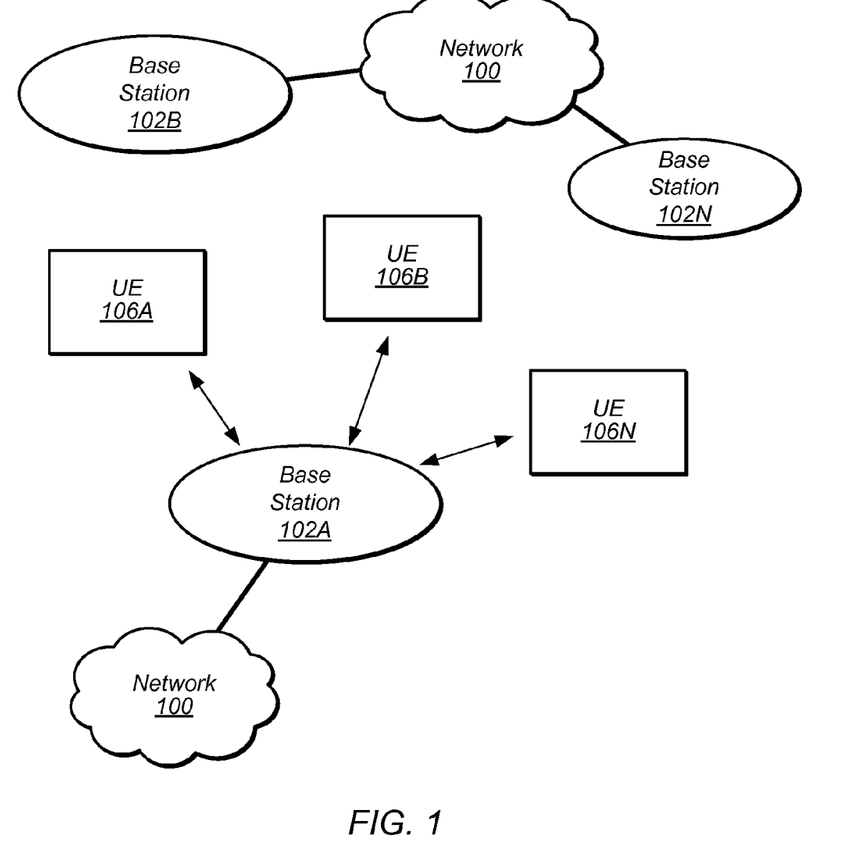
FIG. 1 illustrates an exemplary (and simplified) wireless communication system.
Figure 2:
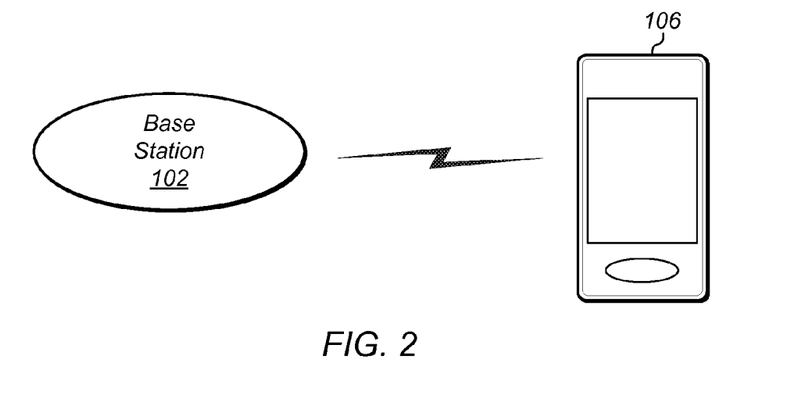
FIG. 2 illustrates a base station ("BS", or "eNodeB" or "eNB" in an LTE context) in communication with a user equipment ("UE") device.

FIGS. 1 and 2—Communication System

FIG. 1 illustrates an exemplary (and simplified) wireless communication system. It is noted that the system of FIG. 1 is merely one example of a possible system, and embodiments of the invention may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various wireless communication technologies, such as GSM, UMTS (WCDMA, TDS-CDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may provide a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N). The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

In some embodiments, the UE 106 may be configured to communicate using any of multiple radio access technologies/wireless communication protocols. For example, the UE 106 may be configured to communicate using two or more of GSM, UMTS, CDMA2000, LTE, LTE-A, WLAN/Wi-Fi, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
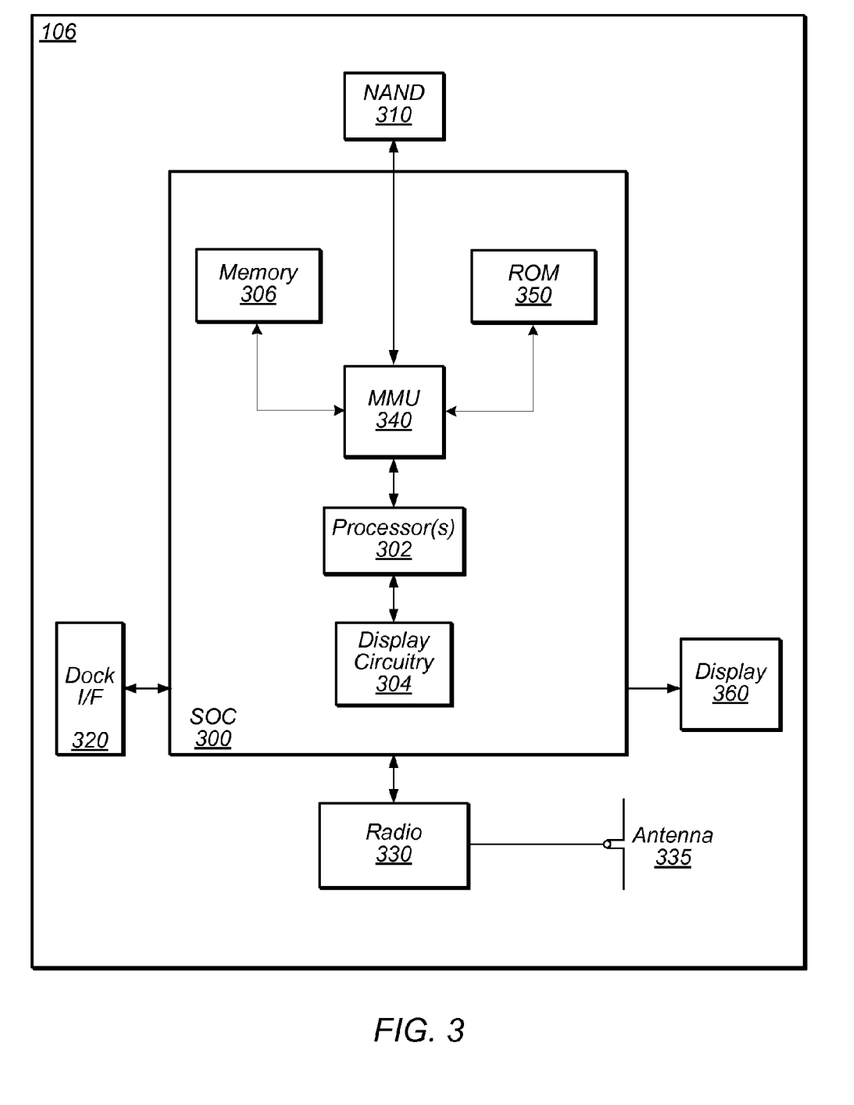
FIG. 3 illustrates an exemplary block diagram of a UE.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio(s)) 330 (e.g., for LTE, Wi-Fi, GPS, etc.).

The UE device 106 may include at least one antenna, and in some embodiments multiple antennas, for performing wireless communication with base stations and/or other devices. For example, the UE device 106 may use antenna 335 to perform the wireless communication. As noted above, the UE 106 may be configured to communicate wirelessly using multiple wireless communication standards in some embodiments.

As described further subsequently herein, the UE 106 may include hardware and software components for implementing features for dynamically allocating transmit power between systematic and parity encoded bits, such as those described herein with reference to, inter alia, FIG. 5. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 5.

Figure 4:
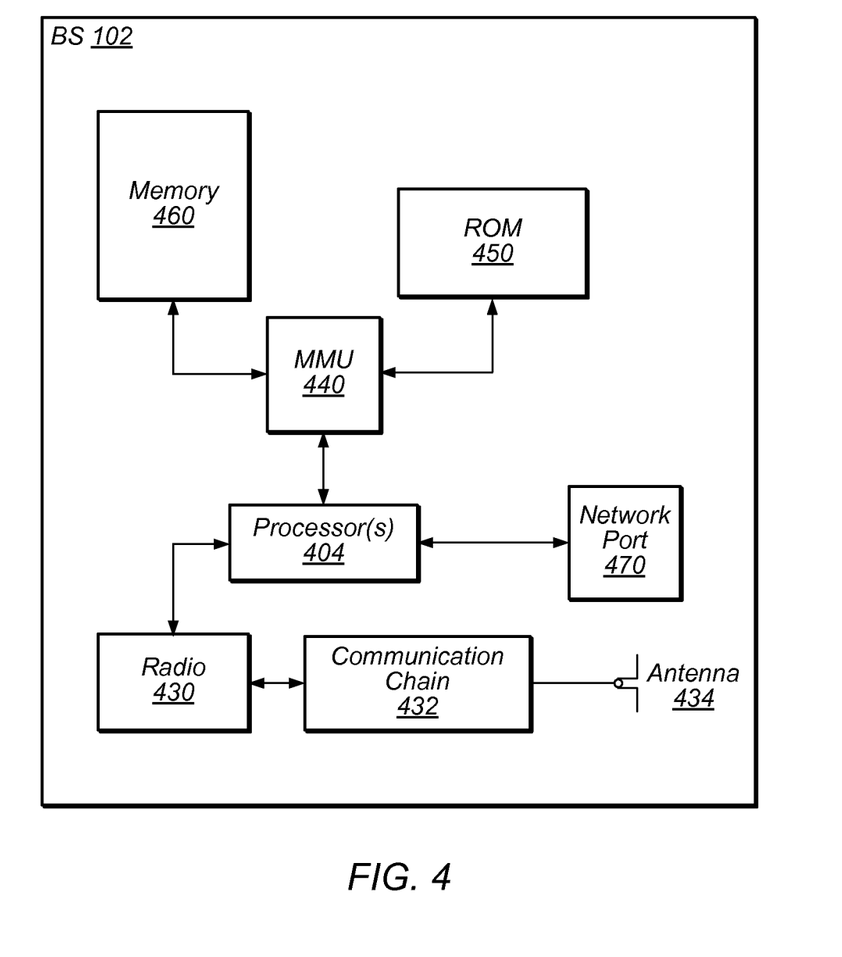
FIG. 4 illustrates an exemplary block diagram of a BS.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

If desired, the BS 102 may be configured to communicate wirelessly using multiple wireless communication technology. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio, which is capable of performing communications according to any of multiple wireless communication technologies (e.g., LTE and Wi-Fi; LTE and UMTS; LTE and CDMA2000; UMTS and GSM; etc.). It is also possible that the BS 102 may be configured to communicate using just one wireless communication technology.

As described further subsequently herein, the BS 102 may include hardware and software components for implementing features for dynamically allocating transmit power between systematic and parity encoded bits, such as those described herein with reference to, inter alia, FIG. 5. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement part or all of the features described herein, such as the features described herein with reference to, inter alia, FIG. 5.

Figure 5:
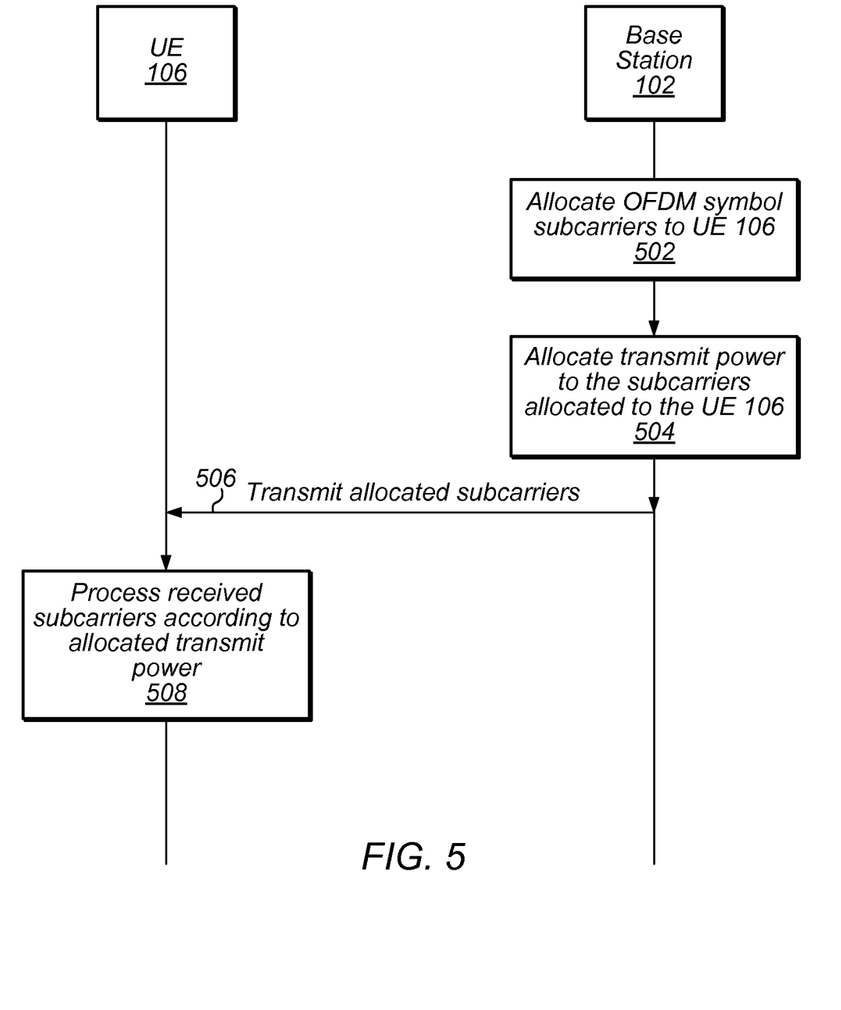
FIG. 5 is a communication flow diagram illustrating an exemplary method for allocating power to encoded bits in an OFDM system.

FIG. 5—Communication Flow Diagram

Wireless communication techniques often utilize forward error correction techniques to improve communication reliability, in particular in noisy conditions which might have the potential to corrupt data transmitted over the transmission medium. Among such forward error correction techniques are coding techniques such as turbo coding and convolutional coding. Such techniques may encode payload data to generate encoded bits, which may include systematic bits (e.g., in which input data is embedded) and parity bits (e.g., which may be generated based on input data in a manner according to the chosen encoding scheme). In other words, in a channel coding scheme, the systematic bits may be related to channel value, while the parity bits may be used to calculate extrinsic information and a-priori information. As one example of a coding scheme, according to LTE (e.g., as specified by 3GPP) turbo codes may be used, with each codeword consisting of three groups, a systematic and two parity group bits.

Depending on any or all of a variety of factors, the relative importance of the systematic bits and the parity bits to successful recovery of information transmitted over the wireless transmission medium in a wireless communication system which utilizes a channel coding scheme for forward error correction may differ at different times.

For example, turbo coding schemes may include performing iterative coding, and while channel value may not change with iterations, extrinsic and a-priori may become more reliable when the number of iterations increases. Parity bits (extrinsic and a-priori information) may thus increase in importance when the number of iterations used increases.

As another example, when the quality of systematic bits is not good, even with good quality of parity bits, the coding gain of interest is not obtained. Systematic bits may thus increase in importance as noise levels increase (e.g., as signal to noise (SNR) or Eb/No values decrease).

Additionally, the code performance may be determined by the distribution of the low weight codewords (e.g., for lower SNRs). The role of the three turbo code groups of bits used in LTE (i.e., a systematic and two parity groups of bits) may not be the same in the weight distribution of the dominant codewords. Therefore, if one group has a stronger contribution to the weight of the dominant codewords, the code distance properties could be improved by assigning more power to that group.

The bit-group dependent power allocation may also be a function of the code block size (or the size of the Turbo code interleaver). The contribution to the distances of the parity or systematic bits can increase with the code block size.

Note that these observations may particularly pertain to additive white gaussian noise (AWGN) channels where systematic and parity check bits are equally protected while transmitted in the channel (in terms of fading).

Given such considerations, it may be desirable to allocate different transmit power levels to systematic and parity bits under different circumstances in such a system. Accordingly, FIG. 5 is a communication/signal flow diagram illustrating such a scheme for allocating transmit power to encoded bits in a wireless communication system. The scheme shown in FIG. 5 may be used in conjunction with any of the computer systems or devices shown in the above Figures, among other devices. As one possibility, the method illustrated in FIG. 5 may be performed between a base station 102 and a wireless user equipment device 106. Note that while the scheme shown in FIG. 5 may be used in conjunction with LTE systems as one possibility, it may also be possible to use such a scheme (or a variation thereon) in conjunction with any of various other wireless communication systems, as desired.

Note that in various embodiments, some of the elements of the scheme shown may be performed concurrently, in a different order than shown, or may be omitted. Additional elements may also be performed as desired. As shown, the scheme may operate as follows.

The base station 102 and the UE 106 may be capable of communicating via a wireless communication link, for example according to LTE or any other desired wireless communication technology. The base station 102 may provide simultaneous downlink wireless communication service to the UE 106 and other wireless devices using orthogonal frequency division multiplexing (OFDM) as a multiple access technique.

The base station 102 may have payload data to be transmitted to the UE 106 by way of downlink wireless communication. In order to transmit the payload data, the BS 102 may first encode the payload data (e.g., by performing turbo coding or another channel coding scheme) to generate systematic bits and parity bits. In some instances, this process may include interleaving the systematic and parity bits and collecting them into a circular buffer.

The collected bit stream may next be mapped to quadrature amplitude modulation (QAM) symbols. The number of bits that may be mapped to each QAM symbol may depend on the type of modulation (e.g., QPSK, 16QAM, 64QAM, etc.) used; for example, two bits might be mapped to each QPSK symbol, four bits might be mapped to each 16QAM symbol, or 8 bits might be mapped to each 64QAM symbol.

As previously noted, the base station 102 may utilize OFDM as a multiple access technique. For example, the base station may operate on a number of frequency channels, may be able to transmit OFDM symbols on each of those channels, and may be able to dynamically assign or allocate certain subcarriers to various wireless devices served by the base station 102 for certain time intervals, for example based on the amount and priority of data buffered for transmission to each of the various wireless devices served by the base station 102.

As a particular example, if the base station 102 operates according to LTE (e.g., as an eNodeB), blocks of narrowband channels (i.e., subcarriers) may be grouped into 180 kHz "resource blocks" (RBs), which may by allocated to the various wireless devices each 1 ms "transmission time interval" (TTI) according to a resource allocation algorithm.

Thus, in order to transmit the payload data over the wireless communication link, in 502, the base station 102 may allocate OFDM symbol subcarriers (e.g., one or more resource blocks, if operating according to LTE) to the UE 106. The QAM symbols carrying the encoded bit stream in which the payload data is embedded may be mapped to the subcarriers allocated to the UE 106.

A certain ("first") portion of the subcarriers allocated to the UE 106 may include systematic bits, and another ("second") portion of the subcarriers allocated to the UE 106 may include parity bits. In some instances, the BS 102 may generate a subcarrier map indicating which of the allocated subcarriers include systematic bits and which of the allocated subcarriers include parity bits.

In 504, the base station 102 may allocate transmit power to the subcarriers allocated to the UE 106. The transmit power may be unevenly distributed between the subcarriers carrying systematic bits and the subcarriers carrying parity bits. In other words, the first portion of the subcarriers may be allocated different transmit power than the second portion of the subcarriers.

At least in some instances, such uneven transmit power allocation may be subject to certain constraints. For example, a limited total power budget may be provided for a given resource allocation to the UE 106; thus, in such a case, allocating power to the subcarriers allocated to the UE 106 may include determining a proportion of the total power budget to allocate to each of the first and second groups of subcarriers.

Another possible constraint may relate to the maximum power variation between OFDM symbols (and thus the maximum transmit power difference between the first and second groups of subcarriers). For example, it may be desirable or possibly necessary to limit power variation between OFDM symbols (within a given transmission interval such as a TTI) to less than a power variation threshold (e.g., to less than 3 dB, as one possibility) in order to not affect the gain applied by automatic gain control (AGC) at the UE 106.

Such uneven transmit power allocation may include boosting power of systematic bits relative to parity bits, or vice versa, based on any of various possible considerations. Such considerations may relate to current conditions (signal to noise ratio or other channel quality indicators) of the wireless communication medium used by the BS 102 and the UE 106 and/or code performance considerations such as code distance and/or code block size, among various possibilities.

As one exemplary possible consideration, a number of coding iterations may affect the transmit power allocation between systematic bits and parity bits. For example, as the number of iterations increases, power allocation may be biased towards increasing transmit power of parity bits relative to systematic bits.

As another exemplary possible consideration, the signal to noise (SNR) or $E_b/N_0$ experienced by the UE 106 signal to noise ratio may affect the transmit power allocation between systematic bits and parity bits. For example, as the SNR or $E_b/N_0$ decreases, power allocation may be biased towards increasing transmit power of systematic bits relative to parity bits. Note that if desired, under high SNR conditions, the number of turbo iterations may be reduced along with boosting the transmit power of parity bits.

As a still further exemplary possible consideration, code block size and/or code distance properties of the coding scheme may affect the transmit power allocation between systematic bits and parity bits. For example, if either parity bits or systematic bits have a stronger contribution to the weight of the dominant codeword, power allocation may be biased towards increasing transmit power of that bit group; which bit group has a stronger contribution to the code distances may depend at least partially on the code block size.

Note that in some instances, the subcarrier power allocation may also depend on the channel quality (per subcarrier); for example if channel state information is available at the base station 102, a group of subcarriers that are encountering a "bad channel" could have their power boosted (e.g., in a manner which may or may not be directly related to whether those subcarriers carry systematic or parity bits).

Such metrics may be considered together to dynamically determine the relative power allocation between systematic and parity bits. For example, consider a scenario in which the code distance indicates that the parity bits should be boosted relative to the systematic bits. If, however, the subcarriers carrying the systematic bits are experiencing a fade in this scenario, the optimal allocation could be different (e.g., more weighted towards the systematic bits), for example since the systematic bits are in a fade, the first transmission may fail, and subsequent HARQ retransmissions with different redundancy version (RV) indices may not result in successful decoding at the UE 106, resulting in reduced throughput.

As an alternate possibility, it should also be noted that an uneven power allocation scheme may be static, if desired. For example, as one possibility, all subcarriers containing systematic bits may be boosted by a constant factor, while the subcarriers containing parity bits may have their power decreased by a factor such that a total power constraint is met.

In 506, the BS 102 may transmit the allocated subcarriers to the UE 106. The allocated subcarriers maybe transmitted according to the allocated transmit power distribution. In other words, the subcarriers comprising systematic bits may be transmitted with a different transmit power level than the subcarriers comprising parity bits.

Depending on the nature of the modulation scheme, it may or may not be necessary to provide an indication of the power distribution of the subcarriers allocated to the UE 106. For example, for quadrature phase shift keying (QPSK), it may not be necessary for the UE 106 to know that different transmit power is used for different subcarriers, since demodulation of the subcarriers may rely only on determining the quadrant and not the magnitude of the signal of each subcarrier.

For higher-order modulation schemes such as 16QAM and 64QAM, however, it may be necessary to provide such information. Any of various ways of indicating the relative boosting factor between the first and second portions of the allocated subcarriers may be used, according to various possible implementations.

As one possibility, the subcarriers containing systematic bits may be aligned (possibly over multiple OFDM symbols within a transmission interval) with one or more reference symbol subcarriers (which may be used by the UE 106 for channel estimation), while the subcarriers containing parity bits may be aligned (likewise possibly over multiple OFDM symbols within a transmission interval) with one or more other reference symbol subcarriers. The first reference symbol aligned with the systematic bits may be boosted (or reduced) by the same factor by which the systematic bits are boosted (or reduced). The remaining reference symbols (e.g., including reference symbols aligned with the parity bits) may not be boosted (or reduced). Assuming the channel does not substantially change between those reference symbols, the UE may thus be able to implicitly determine the factor by which transmit power of the systematic bits is boosted (or reduced) by comparing the power levels of the boosted and unboosted reference symbol subcarriers. The UE may then further be able to implicitly determine the reduce (or boost) factor of the parity bits, e.g., based on the total power budget.

As a further possibility, each of the reference symbol subcarriers may be boosted (or reduced) by the same factor as the subcarriers aligned with those reference symbol subcarriers, such that the UE 106 may implicitly determine the relative power allocations for the bit groups when performing channel estimation using the reference symbol subcarriers aligned with the subcarriers containing each respective bit group. In other words, the reference symbol subcarrier(s) aligned with the subcarriers containing the systematic bits may be allocated power in a relative proportion matching the subcarriers containing the systematic bits and the second reference symbol subcarrier(s) aligned with the subcarriers containing the parity bits may be allocated power in a relative proportion matching the subcarriers containing parity bits, such that the resulting power allocations implicitly signal the relative power allocations of the subcarriers aligned with each respective reference symbol subcarrier.

As another possibility, the boosting factor may be explicitly signaled. In some instances, for a static uneven power allocation scheme, it may be sufficient to simply provide an indication of the boosting factor of one bit group. For example, the UE 106 may be able to determine as part of its channel decoding capabilities which subcarriers contain systematic bits and which subcarriers contain parity bits, and may be aware of the total power budget, and so may be able to deduce the corresponding reducing factor of the other bit group, and process the received subcarriers accordingly.

Alternatively, for example if a dynamic uneven power allocation scheme is desired such that specific subcarriers may be boosted or reduced, a resource bit map or other such indication of individual subcarrier boosting/reducing factors may be explicitly signaled to the UE 106 by the BS 102.

In 508, the UE 106 may process the received subcarriers according to the allocated transmit power of each received subcarrier. The UE 106 may determine the relative power allocations of the first portion of the allocated subcarriers and the second portion of the allocated subcarriers implicitly (e.g., using channel estimation of reference symbol subcarriers aligned with the first and second portions of the allocated subcarriers to determine relative power allocations of the first and second portions of the allocated subcarriers) or explicitly (e.g., based on an indication of the boosting factor for one bit group, a resource bitmap indicating relative power allocations of individual subcarriers, or any other desired type of indication), e.g., depending on the manner used by the BS 102 to indicate those relative power allocations.

Processing the received subcarriers may include demodulating the received subcarriers and decoding the encoded bit stream, among various processing operations, as desired.

Note that if desired, the UE 106 may also utilize uneven power allocation to systematic and parity bits for an uplink transmission to the BS 102. Similar considerations may affect such power allocation as previously described herein, such as channel quality, signal to noise ratio, code distance, code block size, number of coding iterations, etc., to determine whether or not and to what degree to boost transmit power of systematic bits relative to parity bits or vice versa. In some instances (e.g., if the BS 102 and the UE 106 communicate according to LTE) such uplink communication may be performed using single carrier frequency division multiplexing. In such a case, the uneven power allocation between systematic and parity bits may be performed in the time domain (before the Discrete Fourier Transform (DFT), e.g., as opposed to the frequency domain).

FIGS. 6-12—Additional Information

FIGS. 6-12 and the following information provided in conjunction therewith illustrate certain possible exemplary features and details which may be used in connection with the method of FIG. 5 according to LTE or LTE-A based implementations, and are not intended to be limiting to the disclosure as a whole. Numerous alternatives to and variations of the following details are also possible and should be considered within the scope of the present disclosure.

Figure 6:
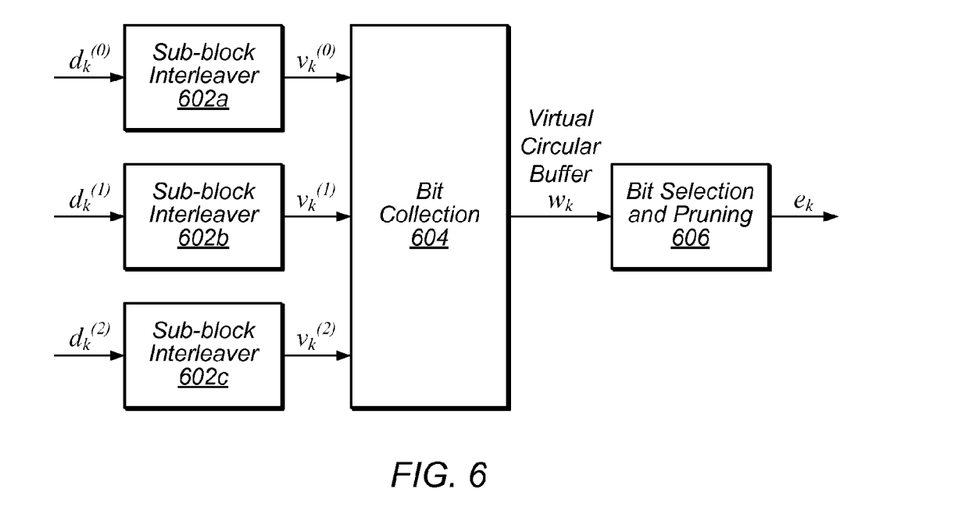
FIG. 6 illustrates an exemplary block diagram of a rate matching scheme for turbo coded transport channels.

FIG. 6 is a block diagram illustrating an exemplary LTE rate matching scheme for turbo coded transport channels. As shown, systematic and parity bit streams may be interleaved at sub-block interleavers 602 and collected by bit collection block 604 into a circular buffer, then provided to a bit selection and pruning block 606. The circular buffer may include a concatenation of the systematic bits with the interlaced parity bits from the two parity sets. The circular buffer may operate per encoded sub-block. The readout from the circular buffer may be controlled through a starting index (depending on rv_idx), and a wraparound point (which may not necessarily be the end of the buffer). The wraparound may take place multiple times, e.g., depending on the coding rate.

Figure 7:
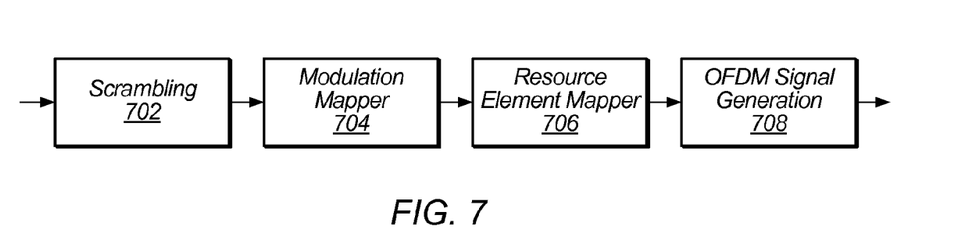
FIG. 7 illustrates an exemplary block diagram of downlink LTE PHY processing without MIMO.

FIG. 7 is a block diagram illustrating an exemplary LTE downlink processing scheme without multiple input multiple output (MIMO). As shown, after information encoding (such as illustrated in FIG. 6) and scrambling in block 702, the bits may be mapped to QAM symbols by a modulation mapper block 704. The QAM symbols may then be mapped to resource elements (REs) or subcarriers by a resource element mapper block 706. Once QAM symbols are mapped to resource elements, the signals to be transmitted may be generated by a OFDM signal generation block 708.

Note that according to LTE, all the subcarriers carrying data may receive the same power allocation per UE and per OFDM symbol (carrying or not carrying RS). Note also that 3GPP defines rho_a/rho_b: the ratio of the data subcarriers to the reference symbol (RS) subcarriers for OFDM symbols (carrying or not carrying RS).

Figure 8:
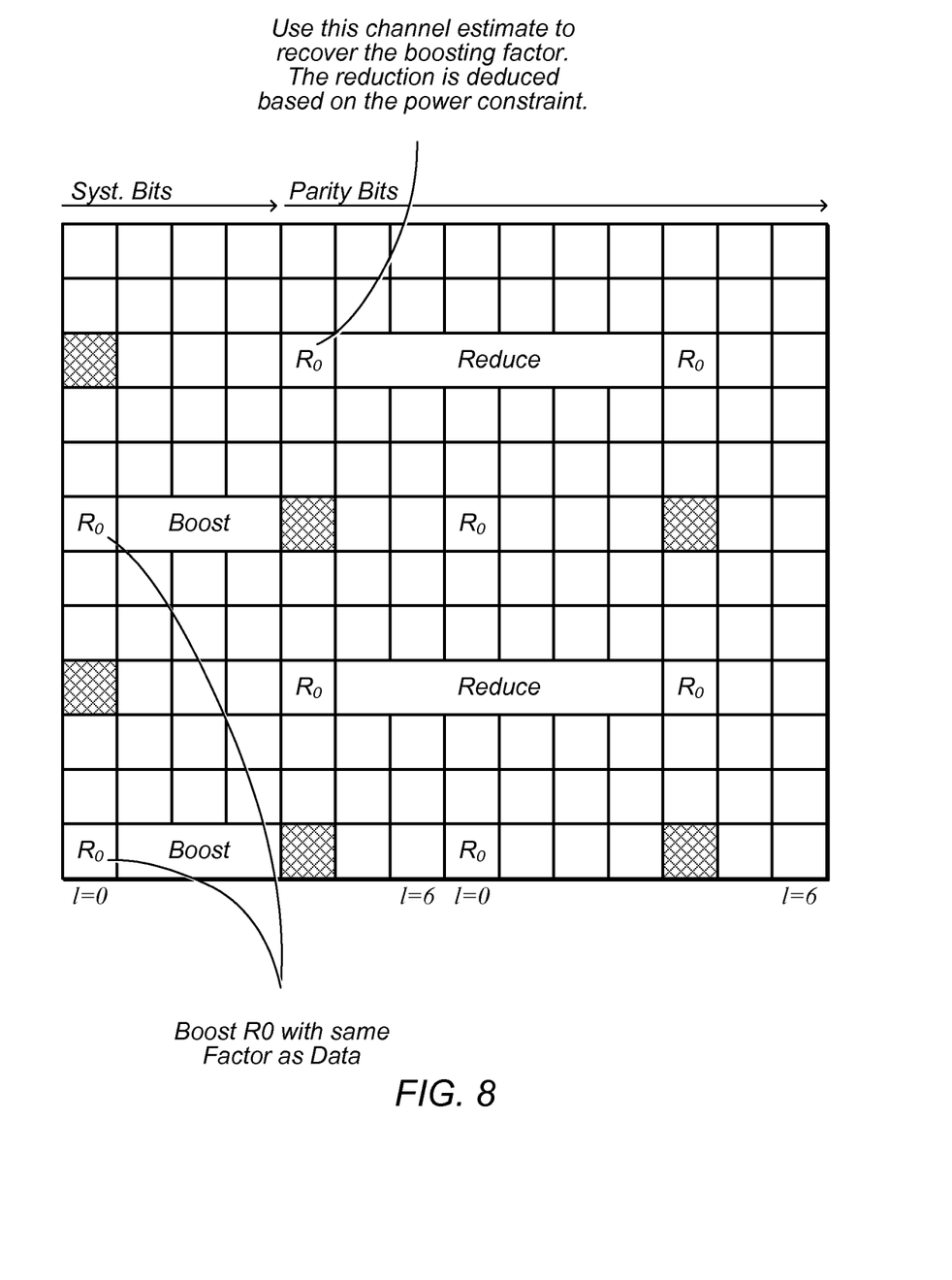
FIG. 8 illustrates an exemplary scheme for implicitly signaling relative power allocations of systematic and parity bits.

FIG. 8 illustrates an exemplary scheme for implicitly signaling power allocation of systematic bits and parity bits in LTE. As shown, for a given resource block at a given TTI, certain subcarriers may be RS subcarriers. Due to the interleaver and circular buffer structure, the systematic bits may be grouped (aligned) substantially with certain (earlier) of the RS subcarriers, while the parity bits may be grouped (aligned) substantially with certain (later) of the RS subcarriers. Thus, if the systematic bits are allocated greater transmit power than the parity bits by a certain boosting factor, the transmit power of the first reference symbol subcarriers aligned with the systematic bits may be boosted by the same factor. In such a case, the transmit power of the parity bits may be reduced by a reducing factor selected proportionally such that the total power budget for the RB for the given TTI is met. The transmit power of the remaining reference symbol subcarriers (e.g., including those aligned with the parity bits) may not be boosted. Thus, it may be possible to recover the boosting factor using the channel estimate by comparing the first reference symbol subcarriers (aligned with the systematic bits) with the subsequent reference symbol subcarriers. Once the boosting factor is recovered, it may then be possible to infer the reducing factor based on the power constraint.

Figure 9:
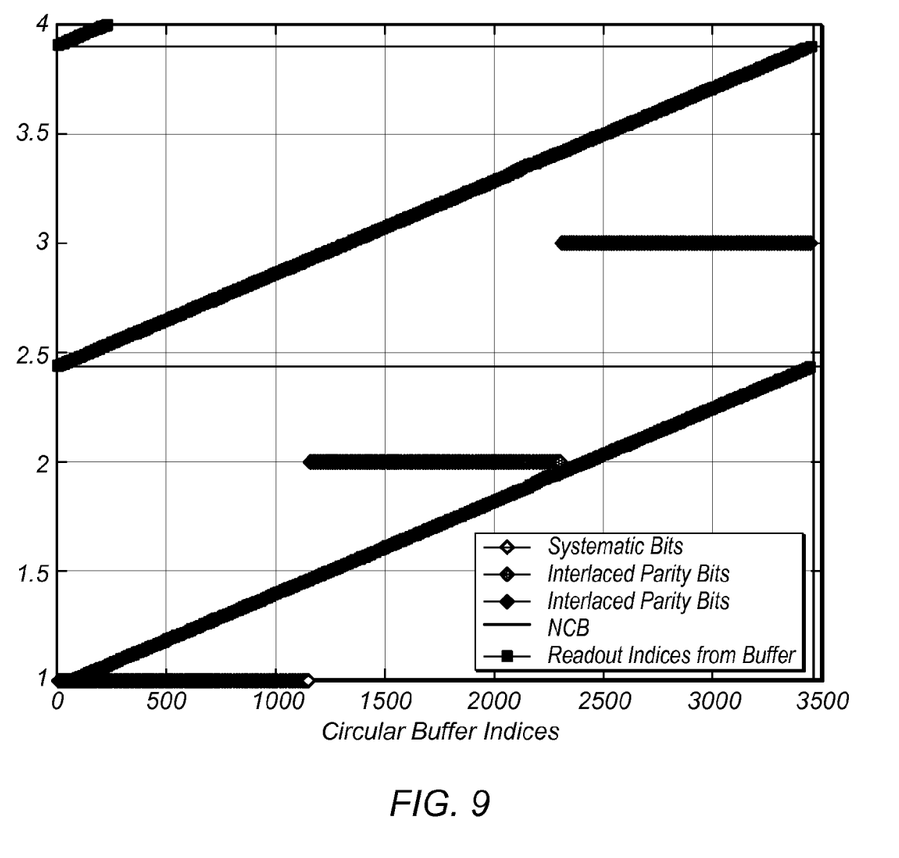
FIG. 9 illustrates an exemplary circular buffer readout.

FIG. 9 illustrates a circular buffer readout for an exemplary scenario in which 25 RBs are allocated to a UE, QPSK modulation is used, with a rate of 0.1588. As can be seen, the systematic and interlaced parity bits may be repeated as the circular buffer readout wraps around. Therefore, within a TTI interval there could be a succession of OFDM symbols containing systematic bits, systematic and parity bits, or parity bits only, with the pattern repeating for the rest of the TTI interval. According to 3GPP specifications, it may be the case that the power of each OFDM data tone remains constant per UE allocation inside an OFDM symbol. In other words, it may only vary as a function of non-pilot and pilot carrying symbol.

Figure 10:
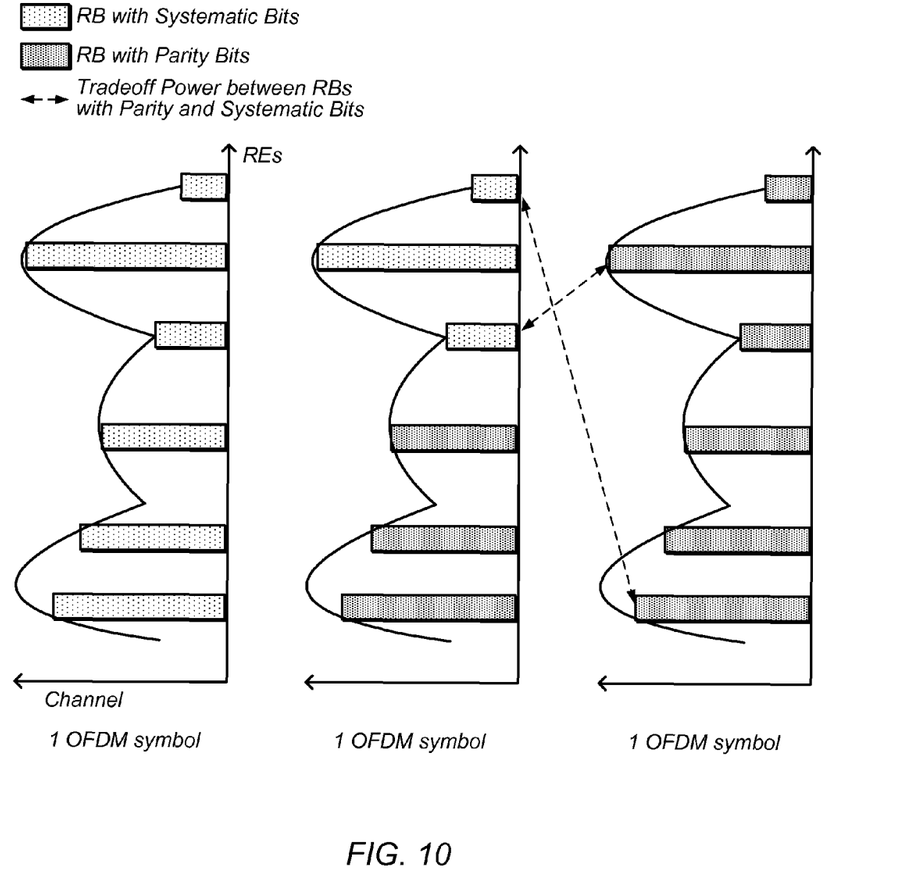
FIG. 10 illustrates an exemplary scheme for unevenly allocating downlink transmit power between systematic and parity bits.

FIG. 10 illustrates an exemplary possible uneven power allocation scenario. In the illustrated scenario, a specific UE may be allocated the illustrated resource elements for a particular TTI. The resource elements in the first OFDM symbol of the first slot of the TTI may contain only systematic bits, as shown. Certain of the resource elements in the second OFDM symbol may contain systematic bits, while other of the resource elements in the second OFDM symbol may contain parity bits. The resource elements in the third OFDM symbol may contain only parity bits.

Instead of providing fixed power of data REs at each OFDM symbol, as illustrated in FIG. 10, it may be possible to allocate power differently per RB between systematic bit and parity bit subcarriers. In other words, it may be possible to tradeoff power between RBs with parity and systematic bits across OFDM symbols.

Figure 11:
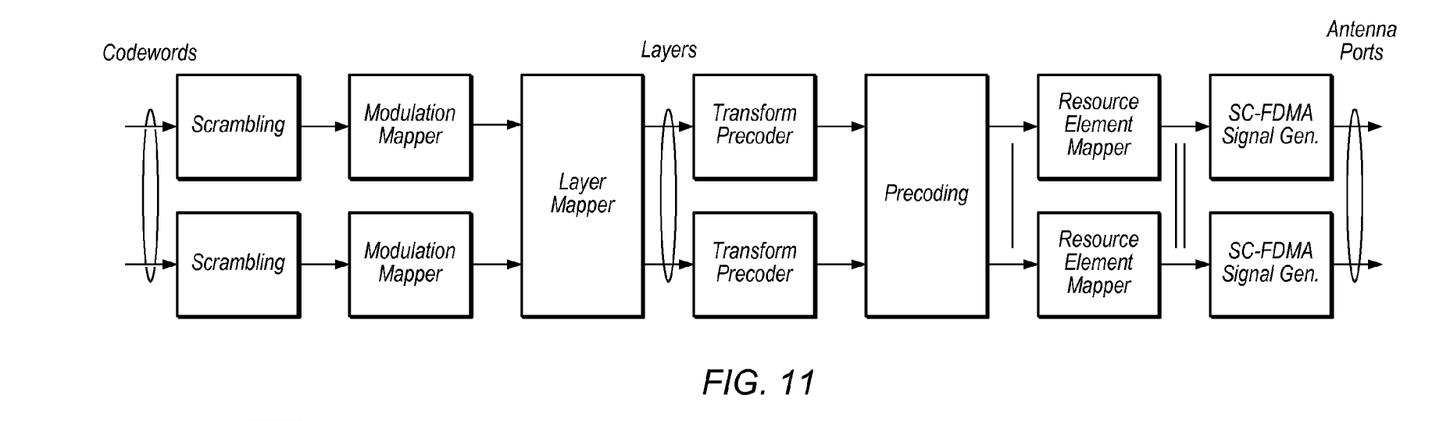
FIG. 11 illustrates an exemplary block diagram of uplink LTE signal processing.

As noted with respect to FIG. 5, if desired it may also be possible to unevenly allocate transmit power between systematic and parity bits for uplink transmissions as well. FIG. 11 illustrates an exemplary LTE uplink signal processing scheme using multiple ports which may be used in conjunction with such a technique.

It will be recognized that the exemplary LTE uplink signal processing scheme includes some similar elements as may be used for LTE downlink signal processing (e.g., scrambling, modulation mapping, resource element mapping), but also includes some different elements, which may relate to the use of single carrier frequency division multiple access (SC-FDMA) for LTE uplink communication rather than OFDM, as well as the use of multiple antenna ports.

The transform precoder may correspond to the Discrete Fourier Transform (DFT) for single port transmission. The systematic (S) and parity (P) bits may enter the modulation mapper. Because of the DFT spreading it may be the case that power allocation cannot take place in the frequency domain. Accordingly, the power allocation may take place in the time domain, e.g., before the transform precoder. Thus, since such a mechanism may occur before the DFT, it may not have an impact on channel estimation. As a result, it may be possible to use such a mechanism for any modulation size, e.g., without needing to signal the boosting or reducing factor.

Figure 12:
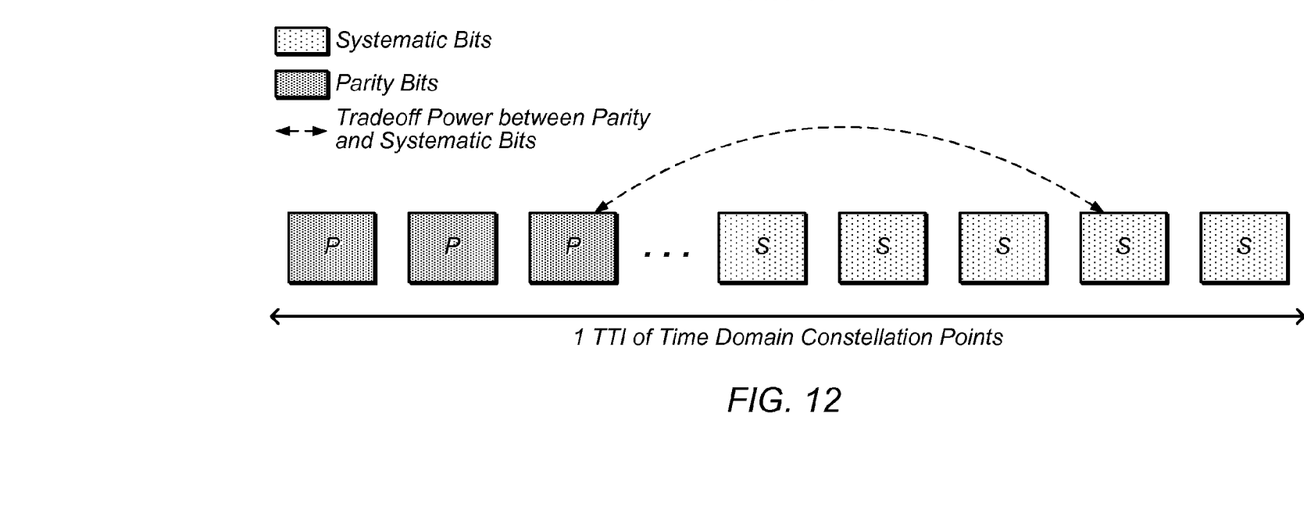
FIG. 12 illustrates an exemplary scheme for unevenly allocating uplink transmit power between systematic and parity bits.

FIG. 12 illustrates such a scheme for unevenly allocating power between systematic and parity bits for an uplink transmission. As shown, over the course of one TTI of time domain constellation points, certain of the constellation points may contain parity bits, while other of the constellation points may contain parity bits. As shown, in order to boost the transmit power of one or the other group of bits while meeting a total transmit power budget for the TTI, a power tradeoff may be implemented such that the transmit power of constellation points containing one of parity bits or systematic bits may be boosted while the transmit power of constellation points containing the other of parity bits or systematic bits may be reduced.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or a BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A base station (BS), comprising:
a radio; and
an processing element operably coupled to the radio;
wherein the radio and the processing element are configured to:
perform turbo encoding of downlink information for a wireless user equipment (UE) device to generate a plurality of systematic bits and parity bits;
allocate one or more resource blocks to the UE for a first transmission time interval (TTI), wherein the one or more resource blocks comprise a plurality of subcarriers;
map the plurality of systematic bits and parity bits to the plurality of subcarriers, wherein the systematic bits are mapped to a first portion of the subcarriers and the parity bits are mapped to a second portion of the subcarriers;
allocate transmit power to the plurality of subcarriers, wherein the first portion of the subcarriers are allocated different transmit power than the second portion of the subcarriers, wherein allocating power to the first portion of the subcarriers differently than the second portion of the subcarriers is based on a number of coding iterations;
transmit the plurality of subcarriers of the one or more resource blocks to the UE during the first TTI; and
signal a boosting factor to the UE, wherein the boosting factor indicates a degree to which the first portion of the subcarriers are allocated different transmit power than the second portion of the subcarriers.

2. The BS of claim 1, wherein allocating power to the plurality of subcarriers comprises allocating greater transmit power to one of the first portion of the subcarriers or the second portion of the subcarriers relative to the other of the first portion of the subcarriers or the second portion of the subcarriers based on one or more of:
code distance;
or
code block size.

3. The BS of claim 1,
wherein each of the one or more resource blocks comprises a plurality of OFDM symbols,
wherein allocating power to the plurality of subcarriers comprises limiting power variation between the plurality of OFDM symbols of each resource block to less than a power variation threshold.

4. The base station of claim 1, wherein said allocating power to the first portion of the subcarriers differently than the second portion of the subcarriers based on the number of coding iterations comprises allocating more power to the second portion of the subcarriers as the number of coding iterations increases.

5. The base station of claim 1, wherein allocating power to the plurality of subcarriers comprises allocating greater transmit power to one of the first portion of the subcarriers or the second portion of the subcarriers relative to the other of the first portion of the subcarriers or the second portion of the subcarriers based on one or more of:
channel quality; or
signal to noise ratio.

6. A method for performing wireless communication, comprising, by a base station:
allocating orthogonal frequency division multiplexing (OFDM) symbol subcarriers to a wireless user equipment (UE) device, wherein a first portion of the allocated subcarriers comprise systematic bits and a second portion of the allocated subcarriers comprise parity bits;
aligning systematic bits with a first reference symbol subcarrier;
allocating power to the subcarriers allocated to the UE, wherein the subcarriers comprising systematic bits are allocated different power than the subcarriers comprising parity bits, wherein the difference in power is based on code distance or code block size;
wherein transmit power of the first reference symbol subcarrier is boosted in a relative proportion matching the subcarriers comprising systematic bits, wherein transmit power of a second reference symbol subcarrier is not boosted;
wherein resulting power allocations of the first reference symbol subcarrier and the second reference symbol subcarrier are configured to implicitly signal a boosting factor of the subcarriers comprising systematic bits;
wherein the boosting factor of the subcarriers comprising systematic bits in combination with a total power budget are configured to implicitly signal a reducing factor of the subcarriers comprising parity bits; and
transmitting OFDM symbols comprising the subcarriers allocated to the UE according to the allocated power distribution.

7. The method of claim 6, the method further comprising:
performing turbo encoding to generate the systematic bits and the parity bits;
generating a subcarrier map indicating which of the allocated subcarriers comprise systematic bits and which of the allocated subcarriers comprise parity bits;
wherein allocating power to the subcarriers allocated to the UE is based at least in part on the subcarrier map.

8. The method of claim 6,
wherein the subcarriers allocated to the UE are comprised in a plurality of OFDM symbols,
wherein allocating power to the subcarriers allocated to the UE comprises limiting power variation between the plurality of OFDM symbols to less than a power variation threshold.

9. The method of claim 6,
wherein allocating power to the subcarriers allocated to the UE comprises boosting power of systematic bits relative to parity bits or boosting power of parity bits relative to systematic bits based on one or more of:
channel quality; or
signal to noise ratio.

10. The method of claim 6, wherein allocating the OFDM symbol subcarriers comprises performing turbo encoding using a number of coding iterations, wherein the difference in power is also based on the number of coding iterations.

11. A method for performing wireless communication, comprising, by a wireless user equipment (UE) device:
receiving, from a base station, OFDM symbols comprising subcarriers allocated to the UE, wherein a first portion of the allocated subcarriers comprise systematic bits and a second portion of the allocated subcarriers comprise parity bits, wherein the subcarriers comprising systematic bits are allocated different power than the subcarriers comprising parity bits, wherein the difference in power is based on code distance or code block size;
determining relative power allocations of the first portion of the allocated subcarriers and the second portion of the allocated subcarriers, wherein transmit power of reference symbol subcarriers aligned with the first portion of the allocated subcarriers is boosted in a relative proportion matching the first portion of the allocated subcarriers, wherein transmit power of reference symbol subcarriers aligned with the second portion of the allocated subcarriers is not boosted, wherein said determining relative power allocations of the first portion of the allocated subcarriers and the second portion of allocated subcarriers comprises utilizing channel estimation of reference symbol subcarriers aligned with the first portion of the allocated subcarriers and channel estimation of reference symbol subcarriers aligned with the second portion of the allocated subcarriers respectively and a total power budget; and
processing the received OFDM symbols in accordance with the relative power allocations of the first portion of the allocated subcarriers and the second portion of the allocated subcarriers.

12. The method of claim 11, the method further comprising:
allocating power to systematic and parity bits for an SC-FDMA uplink transmission, wherein the systematic bits are allocated different power than the parity bits, wherein the power allocation is performed in the time domain;
transmitting the systematic and parity bits to the base station.

13. The method of claim 12,
wherein allocating power to the systematic and parity bits comprises boosting power of systematic bits relative to parity bits or boosting power of parity bits relative to systematic bits based on one or more of:
channel quality; or
signal to noise ratio.

14. The method of claim 11, wherein the OFDM symbol subcarriers are allocated using turbo encoding having a number of coding iterations, wherein the difference in power is also based on the number of coding iterations.

* * * * *